United States Patent [19]
Conti

[11] 3,975,967
[45] Aug. 24, 1976

[54] CORROSION RESISTANT BOURDON TUBE

[75] Inventor: Jack Conti, Norwalk, Conn.

[73] Assignee: Dresser Industries, Inc., Dallas, Tex.

[22] Filed: Apr. 21, 1975

[21] Appl. No.: 570,523

[52] U.S. Cl. .................................. 73/411; 73/418
[51] Int. Cl.² ........................................... G01L 7/04
[58] Field of Search ............ 73/418, 411; 92/103 M, 92/103 R, 91, 47; 75/126 R

[56] References Cited
UNITED STATES PATENTS

| | | | |
|---|---|---|---|
| 2,174,171 | 9/1939 | Wasson | 73/418 |
| 3,723,098 | 3/1973 | Hunt | 75/12 |
| 3,723,101 | 3/1973 | Hunt | 75/49 |

Primary Examiner—S. Clement Swisher
Assistant Examiner—Denis E. Corr
Attorney, Agent, or Firm—Daniel Rubin

[57] ABSTRACT

A corrosion resistant Bourdon tube for pressure gauges and the like formed of a vacuum purified ferritic stainless steel containing by weight about 26 percent chromium, about 1 percent molybdenum and ultra-low carbon and nitrogen content on the order of about 0.002 and 0.008 percent, respectively. By virtue of the metallurgical structure of this composition affording good weldability and ductility, a Bourdon tube fabricated therefrom is characterized by substantial immunity to chloride stress cracking, and high resistance to both sulfide damage and pitting corrosion.

7 Claims, 1 Drawing Figure

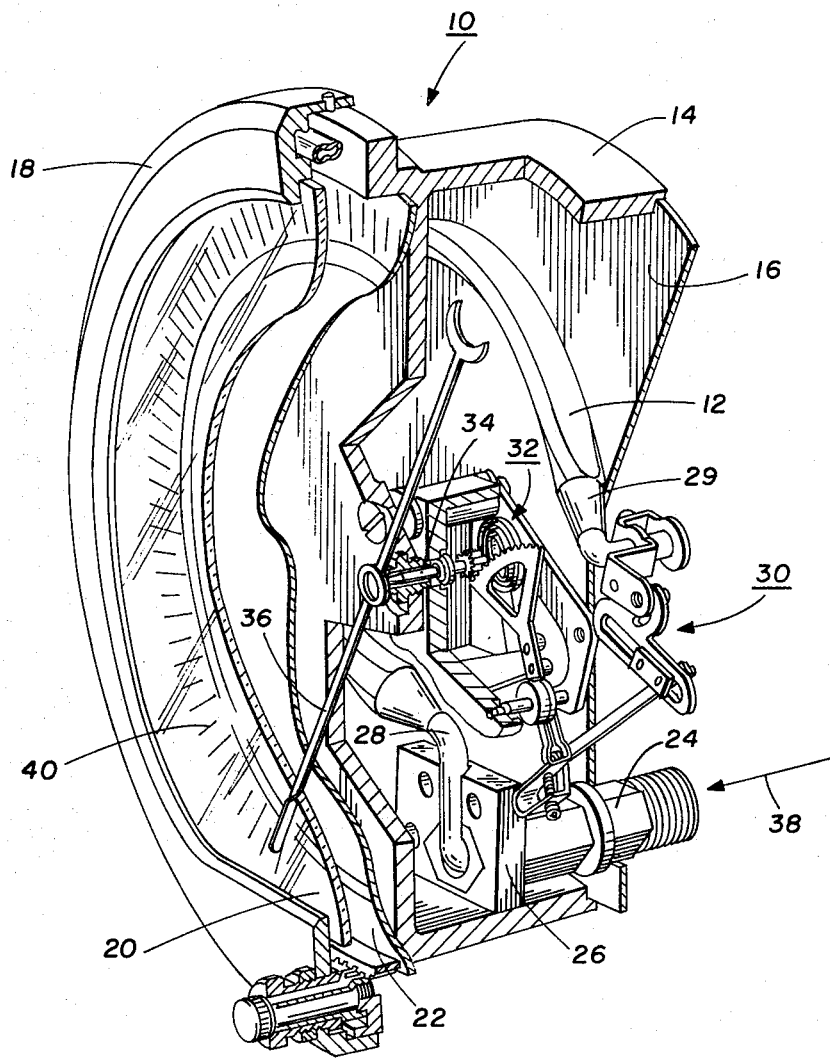

CORROSION RESISTANT BOURDON TUBE

CROSS REFERENCE TO RELATED APPLICATIONS

None.

BACKGROUND OF THE INVENTION

1. The field of art to which the invention pertains comprises the art of measuring and testing of fluid pressures.

2. Ever since the invention of a pressure displaceable tube by E. Bourdon in U.S. Pat. No. 9,163, the Bourdon tube has by and large become the industry standard in pressure instruments of all types. Basically, the tube in flattened form is appropriately coiled and on exposure to pressure changes applied either internally or externally, responds predictably in a correlated winding or unwinding displacement at its free end. By translating tube displacement via a geared movement or the like into a useful output form, it is possible to derive various pressure sensitive instruments, the most common of which is the pressure gauge.

Fundamentally important in the fabrication of a Bourdon tube is a material composition of appropriate properties. Not only must the material composition have sufficient strength to withstand the pressures to which it is to be subjected but it must likewise by characterized by good ductility and weldability to enable desired shaping and pressure-tight assembly within the instrument in which it is to be used.

Depending on the contemplated service, it is common to construct such Bourdon tubes of a chemically compatible composition such as a copper or nickel base alloy or from various steel alloys commercially available. For corrosion service, a commonly used alloy is AISI type 316 stainless steel. While particularly suitable for a wide variety of corrosive environments AISI type 316 stainless steel is nonetheless susceptible to stress corrosion cracking in the presence of chlorides and is therefore generally unsuitable for direct use in the processing of crude oil or the like. In those instances where exposure to chlorides and sulfides is likely to be encountered, it has been common to employ a diaphragm seal of the type disclosed, for example, in U.S. Pat. No. 3,202,063. The diaphragm seal in those applications acts as a guard by being positioned intervening between the measured fluid and the Bourdon tube in order to protect the latter from chemical attack by the former. Needless to say, such diaphragm seals are an added expense to both install and maintain yet despite their added costs it has not heretofore been known how to effect their elimination for service conditions likely to expose the Bourdon tube to chlorides and sulfides in the measured fluid.

SUMMARY OF THE INVENTION

The invention relates to Bourdon tubes and particularly to pressure gauges or other pressure instruments using such tubes. More specifically, the invention relates to construction of such Bourdon tubes of a material composition characterized by substantial immunity to chloride stress corrosion cracking while otherwise retaining the virtuous physical properties of type 316 stainless steel, namely good weldability and ductility with high resistance to both hydrogen sulfide damage and pitting corrosion. This is achieved in accordance herewith by constructing a Bourdon tube of a ferritic iron chromium alloy obtained from a vacuum purification process as to contain about 26 percent by weight chromium, 1 percent by weight molybdenum and ultralow carbon and nitrogen content on the order of about 0.002 and 0.008 percent by weight, respectively. By virtue of the increased corrosion resistance which this material composition attributes to the Bourdon tube, the need for the relatively costly diaphragm seals previously utilized in chloride-sulfide combinations and other similar service applications can be eliminated as to afford a highly economical solution to a long standing problem.

It is therefore an object of the invention to provide an improved Bourdon tube construction for corrosion service.

It is a further object of the invention to provide an improved Bourdon tube as in the previous object offering substantial immunity to chloride stress corrosion cracking.

It is a further object of the invention to provide pressure measuring and testing instrumentation utilizing a Bourdon tube construction in accordance with the previous objects.

BRIEF DESCRIPTION OF THE DRAWING

The drawing is an isometric partially cutaway view of a pressure gauge exemplifying use of a Bourdon tube in accordance herewith.

Referring now to the drawing, there is illustrated a pressure gauge designated 10 exemplifying use of a Bourdon tube 12 in accordance herewith. Forming the gauge instrument is a generally annular casing 14 supporting a rear plate 16 which in combination with a bezel ring 18 supports a crystal 20 overlying a dial plate 22. Extending through rear plate 16 is a socket connection 24 secured to a block 26 and via a tubular connection 28 communicates measured pressure internally to Bourdon tube 12. The free end 29 of the Bourdon tube supports a connecting linkage 30 which through an amplifying movement 32 drives a pointer shaft 34 supporting pointer 36.

The gauge operates in a well known manner such that pressure supplied to socket 24 as represented by arrow 38, is transmitted internally of Bourdon tube 12 causing free end 29 to wind and unwind in correlated response to changing levels of the supply pressure. Displacement of free end 29 is translated through the linkage 30 and movement 32 to displace pointer 36 until opposite dial registration 40 corresponding to the magnitude of pressure being supplied. In the course of operation, the Bourdon tube performs in the upper part of its elastic region such that it constantly operates under a highly stressed condition.

Comprising the material composition of Bourdon tube 12 in accordance herewith is an iron chromium alloy obtained from a vacuum purification process having a predominantly ferritic microstructure at room temperature and consisting essentially of about 24–28 percent by weight chromium, about ½–2 percent by weight molybdenum with less than about 250 p.p.m. combined carbon plus nitrogen content and the balance iron while being essentially free of volatile metallic impurities. A more detailed description of the material composition is disclosed in U.S. Pat. No. 3,723,101 and is believed manufactured and processed according to the teachings of U.S. Pat. No. 3,723,098 and U.S. Pat. No. Re. 27,945, respectively. A suitable composition for these purposes commercially available and corresponding to ASTM A268 is marketed by Airco, Inc. of Berkley, California under the trademark E-BRITE-26-1 being a ferretic stainless steel produced from elecron-beam hearth-refining and consisting essentially of

| | |
|---|---|
| Carbon | 0.01 max |
| Manganese | 0.40 max |
| Phosphorus | 0.02 max |
| Sulphur | 0.02 max |
| Silicon | 0.40 max |
| Nickel+Copper | 0.50 max |
| Chromium | 25.0–27.5 |
| Molybdenum | 0.75–1.50 |
| Copper | 0.2 max |
| Nitrogen | 0.015 max |

When constructed of this composition, it has been found that the highly stressed Bourdon tube exhibits good weldability and ductility with high resistance to hydrogen sulfide damage and pitting corrosion while gaining added immunity to chloride stress corrosion cracking as would otherwise be encountered in pressure gauges utilized in situations comparable to that encountered with crude oil processing. By virtue of the added corrosion resistance which this material composition affords, such gauges or other pressure sensitive instruments utilizing Bourdon tubes of this construction can be utilized in direct contact with the processing fluid without the need for a diaphragm seal to protect the Bourdon tube from line content in the manner of the prior art. By being able to eliminate both the capital and maintenance costs of such diaphragm seals, the construction hereof affords a substantial economic saving over the prior installation practices for such service.

Since many changes could be made in the above construction and many apparently widely different embodiments of this invention could be made without departing from the scope thereof, it is intended that all matter contained in the drawing and specification shall be interpreted as illustrative and not in a limiting sense.

The embodiments of the invention in which an exclusive property or privilege is claimed are defined as follows:

1. In a pressure sensitive instrument including a Bourdon tube operatively responsive to effect an output position change in correlation to changes in pressure from a source with which it is connected, the improvement in which said Bourdon tube is comprised of an iron chromium alloy obtained from a vacuum purification process and having a predominantly ferritic microstructure at room temperature consisting essentially of at least about 24 percent by weight chromium, at least about ½ percent by weight molybdenum, less than about 250 p.p.m. combined carbon plus nitrogen and the balance iron while being essentially free of volatile metallic impurities.

2. In a pressure sensitive instrument according to claim 1 in which said iron chromium alloy consists essentially of between about 24–28 percent by weight chromium and between about ½–2 percent by weight molybdenum.

3. In a pressure sensitive instrument according to claim 2 in which the pressure sensitive instrument comprises a pressure gauge.

4. In a pressure sensitive instrument according to claim 2 in which said iron chromium alloy consists essentially of about 26 percent by weight chromium and about 1 percent by weight molybdenum.

5. A Bourdon tube comprised of an iron chromium alloy obtained from a vacuum purification process and having a predominantly ferritic microstructure at room temperature consisting essentially of at least about 24 percent by weight chromium, at least about ½ percent by weight molybdenum, less than about 250 p.p.m. combined carbon plus nitrogen and the balance iron while being essentially free of volatile metallic impurities.

6. A Bourdon tube according to claim 5 in which said iron chromium alloy consists essentially of between about 24–28 percent by weight chromium and between about ½–2 percent by weight molybdenum.

7. A Bourdon tube according to claim 6 in which said iron chromium alloy consists essentially of about 26 percent by weight chromium and about 1 percent by weight molybdenum.

* * * * *